United States Patent
Patil et al.

(10) Patent No.: US 12,250,287 B2
(45) Date of Patent: Mar. 11, 2025

(54) LINK IDENTIFICATION FOR FRAME CONVEYED INFORMATION

(71) Applicant: QUALCOMM Incorporated, San Diego, CA (US)

(72) Inventors: Abhishek Pramod Patil, San Diego, CA (US); Sai Yiu Duncan Ho, San Diego, CA (US); George Cherian, San Diego, CA (US); Alfred Asterjadhi, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 17/327,424

(22) Filed: May 21, 2021

(65) Prior Publication Data

US 2021/0377369 A1    Dec. 2, 2021

Related U.S. Application Data

(60) Provisional application No. 63/122,010, filed on Dec. 7, 2020, provisional application No. 63/030,240, filed on May 26, 2020.

(51) Int. Cl.
| | |
|---|---|
| *H04L 69/22* | (2022.01) |
| *H04L 47/62* | (2022.01) |
| *H04W 76/11* | (2018.01) |
| *H04W 76/15* | (2018.01) |

(52) U.S. Cl.
CPC ............ *H04L 69/22* (2013.01); *H04L 47/624* (2013.01); *H04W 76/11* (2018.02); *H04W 76/15* (2018.02)

(58) Field of Classification Search
None
See application file for complete search history.

(56) References Cited

U.S. PATENT DOCUMENTS

| | | | |
|---|---|---|---|
| 2011/0051669 A1* | 3/2011 | Wang | H04L 1/1829 370/328 |
| 2020/0351988 A1* | 11/2020 | Chen | H04W 88/10 |
| 2021/0051574 A1 | 2/2021 | Chu et al. | |
| 2021/0076437 A1* | 3/2021 | Kneckt | H04W 76/11 |
| 2021/0204340 A1* | 7/2021 | Hareuveni | H04W 76/15 |

(Continued)

FOREIGN PATENT DOCUMENTS

| | | |
|---|---|---|
| EP | 3267740 A1 | 1/2018 |
| EP | 4106419 A1 | 12/2022 |
| EP | 4260611 A1 | 10/2023 |

OTHER PUBLICATIONS

U.S. Appl. No. 62/960,352 (Year: 2020).*

(Continued)

*Primary Examiner* — Robert M Morlan
(74) *Attorney, Agent, or Firm* — Harrity & Harrity, LLP

(57) ABSTRACT

Various aspects of the present disclosure generally relate to wireless communication. In some aspects, a receiver device may receive a management frame addressed to the receiver device; parse the management frame to identify a link identifier included in the management frame; associate the link identifier with link information included in the management frame; and update, based at least in part on the link information, a communication configuration for a link identified by the link identifier. Numerous other aspects are provided.

30 Claims, 8 Drawing Sheets

(56) References Cited

U.S. PATENT DOCUMENTS

| | | | |
|---|---|---|---|
| 2021/0219363 A1* | 7/2021 | Jiang | H04W 24/08 |
| 2022/0132376 A1* | 4/2022 | Wang | H04W 28/24 |
| 2023/0224710 A1* | 7/2023 | Huang | H04W 12/10 |
| | | | 726/5 |

OTHER PUBLICATIONS

Abhishek P (Qualcomm): "MLO: Container Structure for Capability Advertisement", IEEE Draft, 11-20-0357-00-00BE-MLO-Container-Structure-for-Capability-Advertisement, IEEE-SA Mentor, Piscataway, NJ USA, vol. 802.11 EHT, 802.11be, Apr. 9, 2020 (Apr. 9, 2020), pp. 1-27, XP068167434, Retrieved from the Internet: URL:https://mentor.ieee.org/802.11/dcn/20/11-20-0357-00-00be-mlo-container-structure-for-capability-advertisement.pptx [retrieved on Apr. 9, 2020] p. 2 p. 5-p. 6 p. 10-p. 11.
International Search Report and Written Opinion—PCT/US2021/070602—ISA/EPO—Sep. 9, 2021.
Taiwan Search Report—TW110118825—TIPO—Sep. 5, 2024.

\* cited by examiner

LINK IDENTIFICATION FOR FRAME CONVEYED INFORMATION

CROSS-REFERENCE TO RELATED APPLICATION

This Patent application claims priority to U.S. Provisional Patent Application No. 63/030,240, filed on May 26, 2020, entitled "LINK IDENTIFICATION FOR MANAGEMENT FRAME CONVEYED INFORMATION" and to U.S. Provisional Patent Application No. 63/122,010, filed on Dec. 7, 2020, entitled "LINKED IDENTIFICATION FOR FRAME CONVEYED INFORMATION," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for link identification for management frame conveyed information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a receiver device (e.g., a multi-link device) includes receiving a management frame addressed to the receiver device; parsing the management frame to identify a link identifier included in the management frame; associating the link identifier with link information included in the management frame; and updating, based at least in part on the link information, a communication configuration for a link identified by the link identifier.

In some aspects, a receiver device for wireless communication includes a memory and one or more processors coupled to the memory, the one or more processors configured to receive a management frame addressed to the receiver device; parse the management frame to identify a link identifier included in the management frame; associate the link identifier with link information included in the management frame; and update, based at least in part on the link information, a communication configuration for a link identified by the link identifier.

In some aspects, a non-transitory computer-readable medium storing one or more instructions for wireless communication includes one or more instructions that, when executed by one or more processors of a receiver device, cause the one or more processors to receive a management frame addressed to the receiver device; parse the management frame to identify a link identifier included in the management frame; associate the link identifier with link information included in the management frame; and update, based at least in part on the link information, a communication configuration for a link identified by the link identifier.

In some aspects, an apparatus for wireless communication includes means for receiving a management frame addressed to the apparatus; means for parsing the management frame to identify a link identifier included in the management frame; means for associating the link identifier with link information included in the management frame; and means for updating, based at least in part on the link information, a communication configuration for a link identified by the link identifier.

In some aspects, a method of wireless communication performed by a receiver device includes receiving a frame addressed to the receiver device; parsing the frame to identify a link identifier included in the frame; associating the link identifier with link information included in the frame; and updating, based at least in part on the link information, a communication configuration for a link identified by the link identifier.

In some aspects, a receiver device for wireless communication includes a memory, one or more processors coupled to the memory, and a set of queues, wherein the one or more processors are configured to: receive a frame; identify the frame as link-specific or link agnostic based at least in part on a type or sub-type field in a medium access control header of the frame; and assign the frame to a queue of the set of queues.

In some aspects, a receiver device for wireless communication includes a memory and one or more processors coupled to the memory, the one or more processors configured to: receive a frame addressed to the receiver device; parse the frame to identify a link identifier included in the frame; associate the link identifier with link information included in the frame; and update, based at least in part on the link information, a communication configuration for a link identified by the link identifier.

In some aspects, a non-transitory computer-readable medium storing a set of instructions for wireless communication includes one or more instructions that, when executed by one or more processors of a receiver device, cause the receiver device with a set of queues to: receive a frame addressed to the receiver device; parse the frame to identify a link identifier included in the frame; associate the link identifier with link information included in the frame; and update, based at least in part on the link information, a communication configuration for a link identified by the link identifier.

In some aspects, a non-transitory computer-readable medium storing a set of instructions for wireless communication includes one or more instructions that, when executed by one or more processors of a receiver device, cause the receiver device to: receive a frame; identify the frame as link-specific or link agnostic based at least in part on a type or sub-type filed in a medium access control header of the frame; and assign the frame to a queue of the set of queues.

In some aspects, an apparatus for wireless communication includes means for receiving a frame addressed to the receiver device; means for parsing the frame to identify a link identifier included in the frame; means for associating the link identifier with link information included in the frame; and means for updating, based at least in part on the link information, a communication configuration for a link identified by the link identifier.

In some aspects, an apparatus includes means for receiving a frame; means for identifying the frame as link-specific or link agnostic based at least in part on a type or sub-type filed in a medium access control header of the frame; and means for assigning the frame to a queue of the set of queues.

In some aspects, a method of wireless communication performed by a receiver device with a set of queues includes receiving a frame; identifying the frame as link-specific or link agnostic based at least in part on a type or sub-type filed in a medium access control header of the frame; and assigning the frame to a queue of the set of queues.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
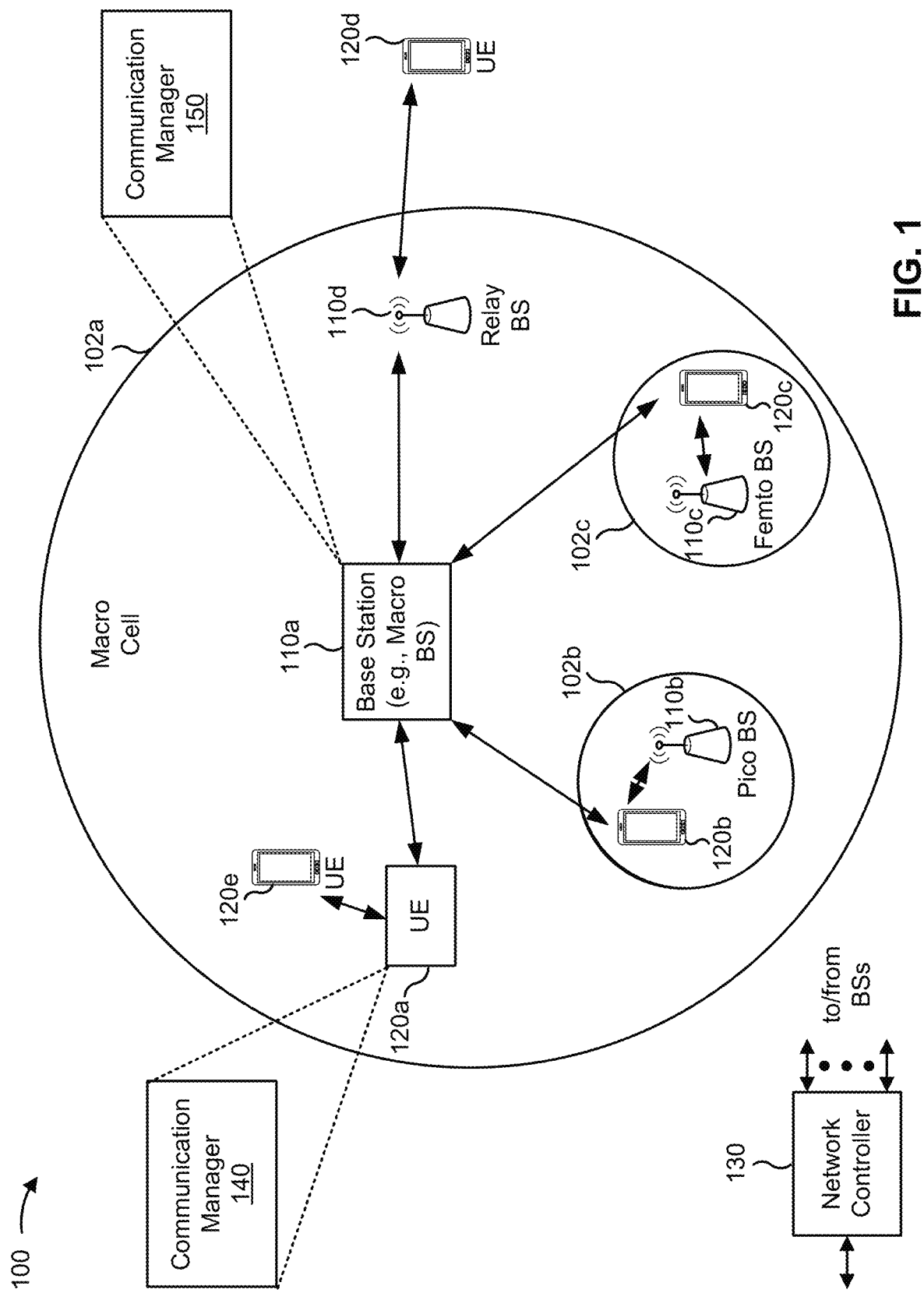
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive a management frame addressed to the receiver device, parse the management frame to identify a link identifier included in the management frame, associate the link identifier with link information included in the management frame, or update, based at least in part on the link information, a communication configuration for a link identified by the link identifier, among other examples. Additionally, or alternatively, the communication manager 140 may perform one or more other operations described herein.

In some aspects, the base station 110 may include a communication manager 150. As described in more detail elsewhere herein, the communication manager 150 may receive a management frame addressed to the receiver device, parse the management frame to identify a link identifier included in the management frame, associate the link identifier with link information included in the management frame, or update, based at least in part on the link information, a communication configuration for a link identified by the link identifier, among other examples. Additionally, or alternatively, the communication manager 150 may perform one or more other operations described herein.

As indicated above, FIG. 1 is provided as an example. Other examples may differ from what is described with regard to FIG. 1.

Figure 2:
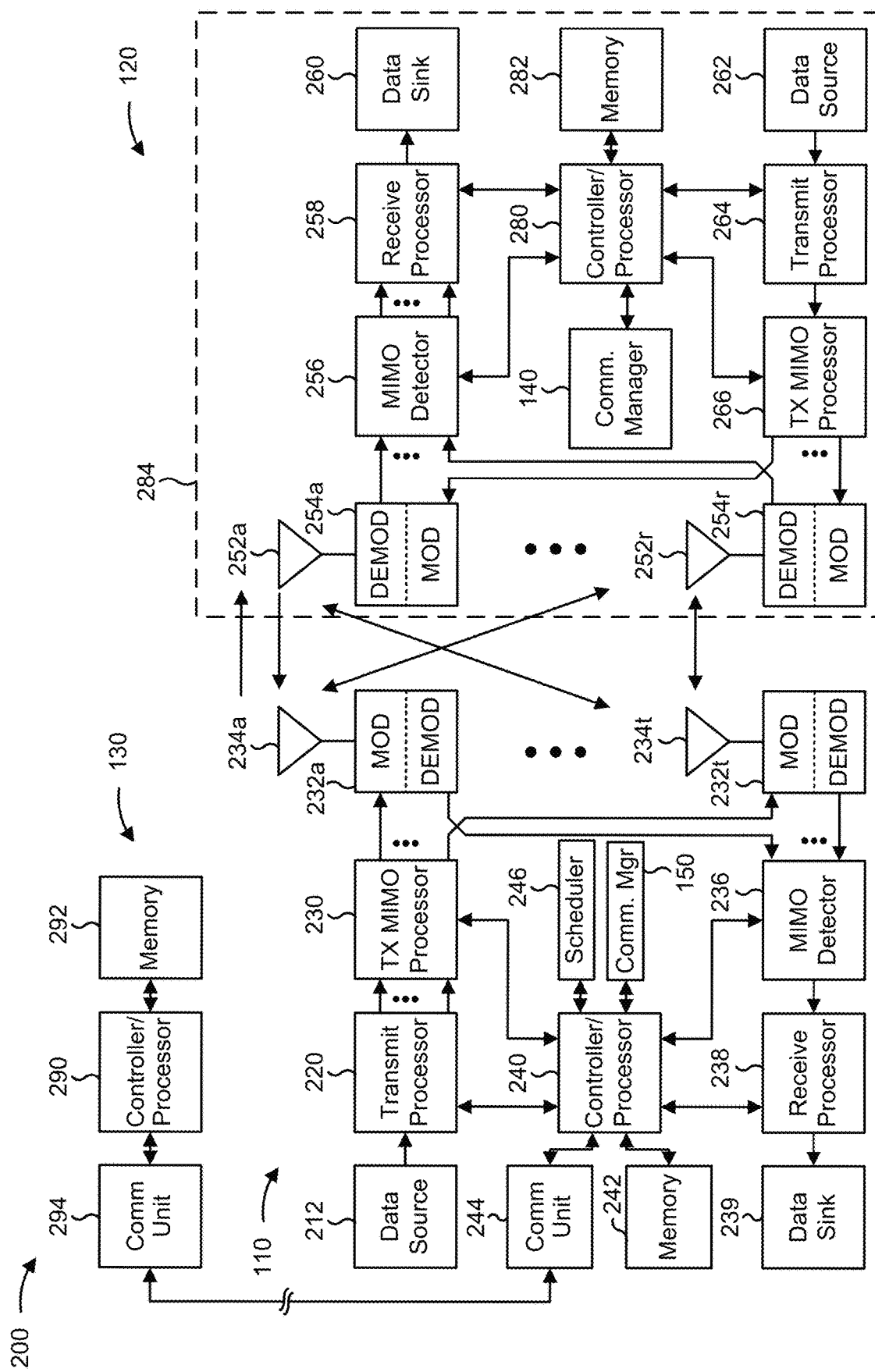
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A-6).

Controller/processor 240 of base station 110, controller/processor 280 of UE 120, and/or any other component(s) of FIG. 2 may perform one or more techniques associated with link identification for frame conveyed information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the receiver device includes means for receiving a management frame addressed to the receiver device; means for parsing the management frame to identify a link identifier included in the management frame; means for associating the link identifier with link information included in the management frame; and/or means for updating, based at least in part on the link information, a communication configuration for a link identified by the link identifier. In some aspects, the means for the receiver device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the receiver device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the receiver device includes means for receiving a frame addressed to the receiver device; means for parsing the frame to identify a link identifier included in the frame; means for associating the link identifier with link information included in the frame; and/or means for updating, based at least in part on the link information, a communication configuration for a link identified by the link identifier. In some aspects, the means for the receiver device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the receiver device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the receiver device includes means for receiving a frame; means for identifying the frame as link-specific or link agnostic based at least in part on a type or sub-type filed in a medium access control header of the frame; and/or means for assigning the frame to a queue of the set of queues. In some aspects, the means for the receiver device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the receiver device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, such as 802.11 type communications systems, a transmitter device (e.g., a multi-link device (MLD)) may transmit data across a plurality of links to a receiver device (another MLD). For example, the transmitter device may transmit frames to the receiver device. In this case, the transmitter device may queue a plurality of frames in a common queue for transmission. The plurality of frames in the common queue may include management frames (e.g., a particular type of frame), which may convey link-specific information (e.g., information applicable to a single link, information applicable to only a subset of the plurality of links, and/or the like).

Based at least in part on the management frames being included in a common queue that is used by a plurality of stations of the transmitter device, any station of the transmitter device may transmit a management frame when a corresponding link is available for use. For example, a first station (e.g., associated with a corresponding medium access control (MAC) entity) of the transmitter device may receive, from the common queue, a management frame and may transmit the management frame to a first station of a receiver device (e.g., associated with a corresponding MAC entity) via a first link. Similarly, a second station of the transmitter device may transmit another management frame via a second link to a second station of the receiver device.

Moreover, a non-access point receiver device or transmitter device may perform basic service set operations on a single link rather than a plurality of links. For example, the transmitter device or receiver device may deactivate one or more stations associated with one or more links to conserve power resources. Additionally, or alternatively, one or more stations may be unreachable as a result of range or channel congestion issues. However, when a non-access point receiver device has an unreachable station, the transmitter device may not be able to update a parameter for a link associated with the unreachable station.

Because the management frames are in a common queue at the transmitter device and assigned to stations based at least in part on link availability, link information in the management frame may not apply to (or may not only apply to) a link on which the management frame is received. As a result, the receiver device may not be able to identify to which link or links the receiver device is to apply link information included in a received management frame. In this case, the receiver device may be unable to update a communication configuration for the link or links, thereby resulting in a lack of synchronization of communication configurations, which may result in dropped communications, reduced throughput, and/or the like.

Some aspects described herein enable the transmitter device (e.g., a first MLD) to include one or more link identifiers in a management frame transmitted to a receiver device (e.g., a second MLD). In this case, the receiver device may receive the management frame, identify the link identifier, associate a link identified in the link identifier with the link information, and update the link with a communication configuration determined based at least in part on the link information. In this way, the transmitter device and the receiver device enable updating of communication configurations for links even when a station associated with the link is unreachable.

Figure 3A:
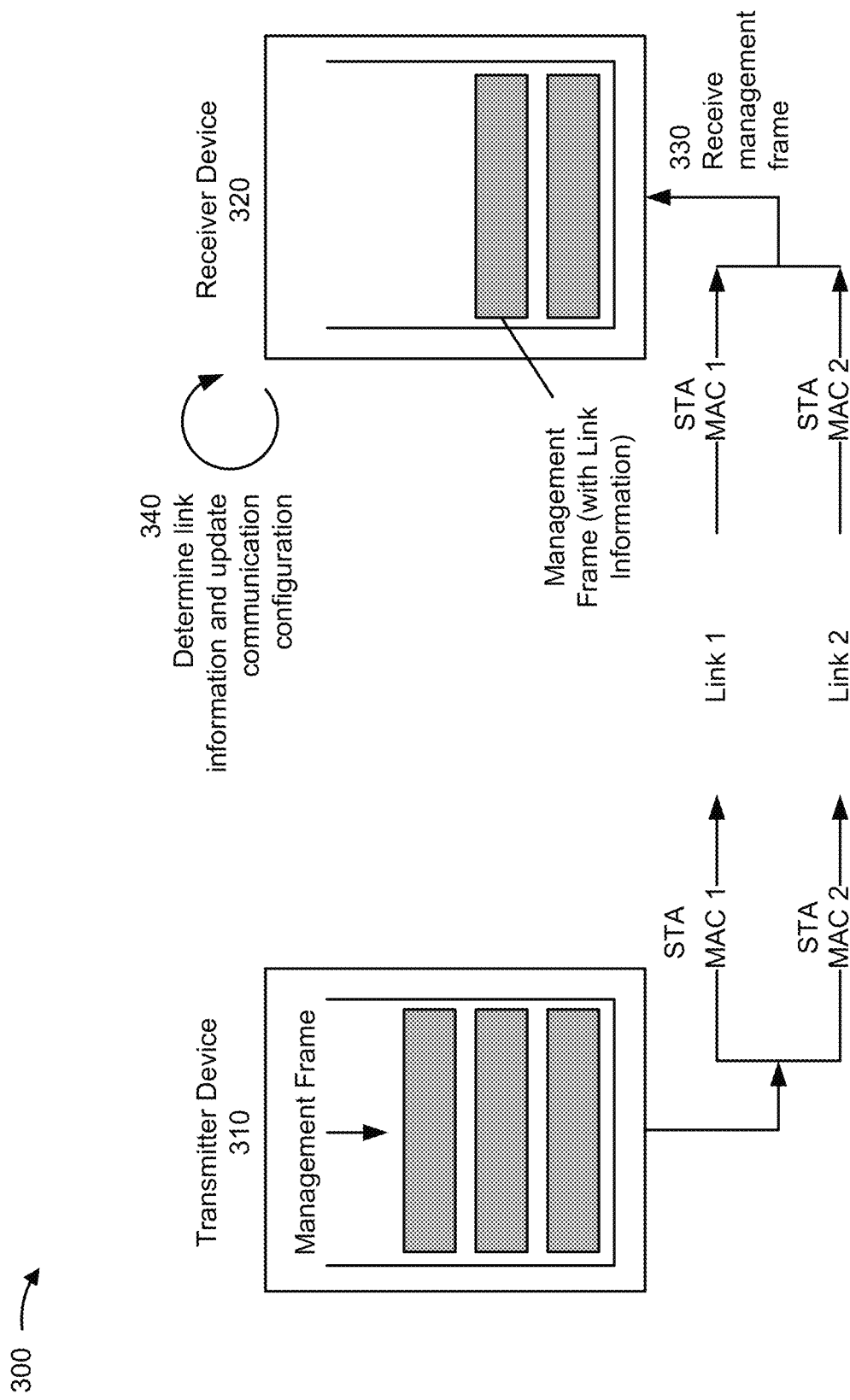
FIGS. 3A and 3B are diagrams illustrating an example associated with link identification for management frame conveyed information, in accordance with the present disclosure.
Figure 3B:
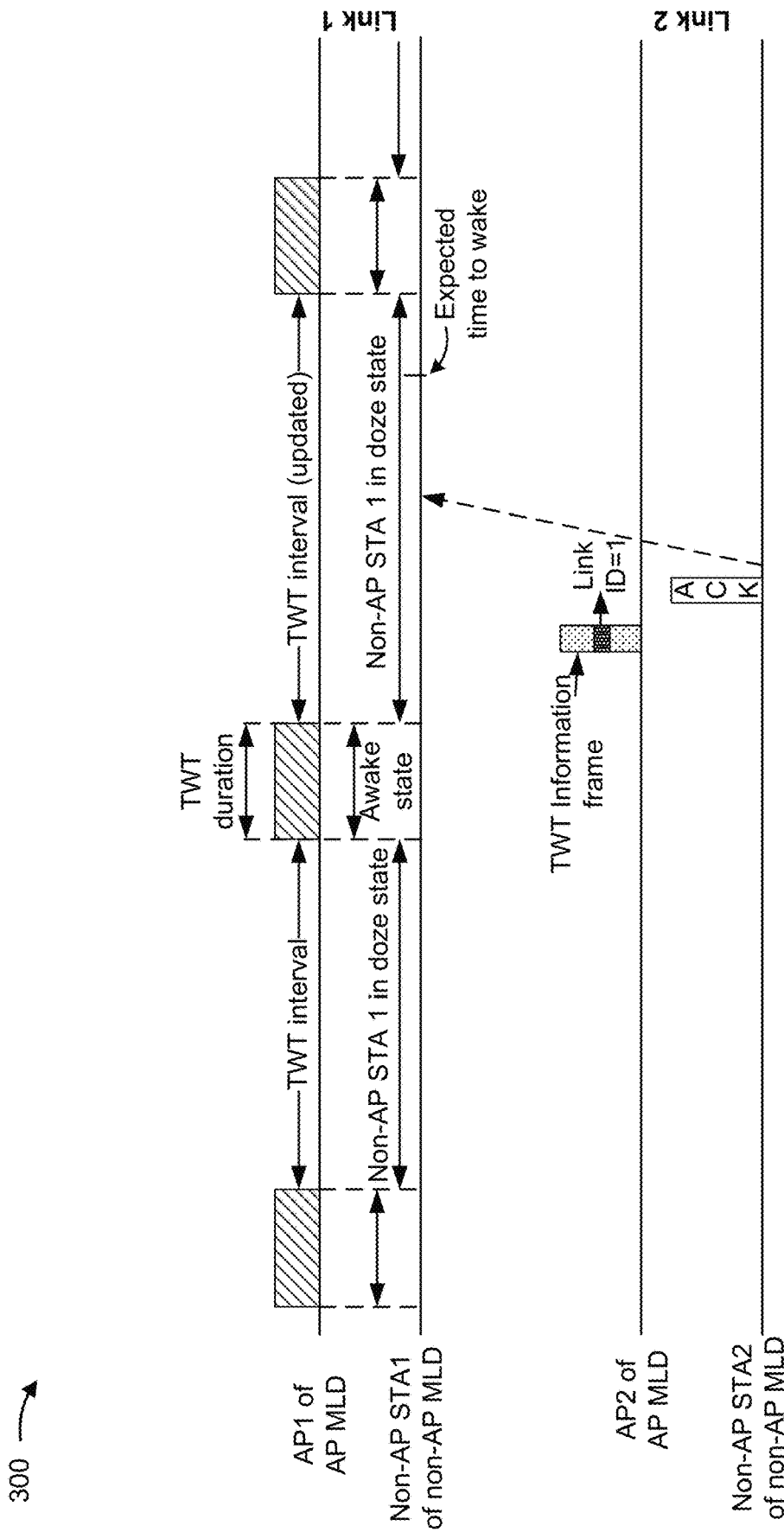

FIGS. 3A and 3B are diagrams illustrating an example 300 associated with link identification for management frame conveyed information or other frame conveyed information, in accordance with the present disclosure. As shown in FIG. 3A, example 300 includes a transmitter device 310 (e.g., a first MLD) and a receiver device 320 (e.g., a second MLD). For example, transmitter device 310 may include a common queue from which one or more management frames or other frames are dequeued to one or more stations (STAs) with corresponding MAC entities. The one or more stations of transmitter device 310 may be associated with one or more links to one or more stations of receiver device 320 (e.g., each of which has a corresponding MAC entity). Received frames may be queued by receiver device 320 in a common queue for processing.

As further shown in FIG. 3A, and by reference number 330, receiver device 320 may receive a management frame or another type of frame. For example, receiver device 320 may receive a management frame with link information identifying a communication configuration for one or more links. In some aspects, transmitter device 310 may configure the management frame to convey a link identifier with the link information. For example, transmitter device 310 may include a link identifier in the management frame to indicate one or more links to which the link information in the management frame is to apply, as described in more detail herein. In this way, transmitter device 310 and receiver device 320 may enable updating of operational parameters on behalf of unreachable stations (e.g., as a result of range, channel conditions, power saving configurations, and/or the like).

As further shown in FIG. 3A, and by reference number 340, receiver device 320 may determine link information and update a communication configuration. For example, based at least in part on receiving the management frame, receiver device 320 may identify a link identifier, associate a link identified by the link identifier with the link information, and update a communication configuration for the link in accordance with the link information.

In some aspects, receiver device 320 may identify the link identifier in a field of the management frame. For example, receiver device 320 may parse an Address 3 (A3) field of the management frame to identify a station (and associated link) to which the link information in the management frame is applicable. In this case, the A3 field may be specified to convey a MAC address of the station to which the link information is applicable. Additionally, or alternatively, the A3 field may be specified to convey an address of receiver device 320 when the link information pertains to, for example, all links of all stations of receiver device 320. In this case, based at least in part on the link identifier being located at a fixed location, a delay associated with identifying the station to which the link information applies (and updating a corresponding communication configuration), may be reduced. Moreover, based at least in part on the A3 field being a protected field, a likelihood of a malicious attacker updating a content of the A3 field to interrupt communication configuration updating may be reduced.

In some aspects, receiver device 320 may differentiate the link identifier. For example, when the link identifier is included in the A3 field and is capable of identifying a station or receiver device with a common MAC address, receiver device 320 may identify a Universal/Local (U/L) bit that is set to indicate whether an identified MAC address is identifying a station or a receiver device.

Additionally, or alternatively, receiver device 320 may identify a header field (e.g., in a MAC header) that indicates whether the MAC address is identifying a station or a receiver device. For example, a configuration with distribution system (DS) fields To DS (e.g., "To Distribution System") set to 0 and From DS ("From Distribution System") set to 1 or with To DS set to 1 and From DS set to 1, which had previously been reserved for management frames, may be specified to be used to signal that the Address 3 field identifies a destination that is an MLD rather than a station thereof. Additionally, or alternatively, receiver device 320 may determine whether the MAC address identifies a station or a receiver device based at least in part on a type of frame. For example, when the management frame is a (Re-)Association Request frame, a (Re-) Association Response frame, or an Authentication frame, receiver device 320 may determine that the MAC address identifies a receiver device. In some aspects, MAC addresses may be specified to be unique to avoid a collision between common MAC addresses of a station or a receiver device.

In some aspects, receiver device 320 may identify a link identifier in a high efficiency (HE) control portion of a header of the management frame. For example, an A-Control field may be specified for the header of the management frame in which a link identifier is conveyed, and receiver device 320 may identify the link identifier. In this way, by providing the link identifier in a fixed location, a delay associated with identifying the link identifier (and updating a corresponding communication configuration) may be reduced, relative to other techniques. In some aspects, the management frame may include the HE control and the link identifier repeated as an information element in a body of the management frame. In this case, receiver device 320 may confirm the link identifier from the body against the link identifier from the header before updating a communication configuration, thereby improving information security (by confirming that the contents of the HE control, such as link identifier information, which are not protected, were not tampered with). Similarly, in some aspects, the management frame may include the HE control and an information element conveying message integrity code (MIC) for the HE control. In this case, receiver device 320 may confirm the MIC for the HE control before updating a communication configuration, thereby improving information security.

Similarly, in some aspects, the management frame may include the HE control and additional authentication data (AAD) bits. For example, receiver device 320 may confirm a variable size AAD (e.g., that may provide security for one or more link identifiers), a fixed size AAD (e.g., that includes one or more bits from a packet number field when the fixed size AAD is to protect a plurality of link identifiers), and/or the like before updating a communication configuration. In this way, transmitter device 310 and receiver device 320 may reduce a likelihood of malicious changes to the link identifier by using security techniques in connection with unprotected HE control data. In some aspects, the link identifier may be in a different portion of a frame (e.g., other than the HE control), such as in a portion of a sequence number (SN) or packet number (PN) or in a portion of the AAD or another field in the frame. In some aspects, the AAD may provide protection to: the HE control; another type of A-Control field (e.g., carried in the HE Control field) that may include the link identifier, the SN, or the PN, the link identifier value or the field carrying the link information; among other examples. In some aspects, the link identifier may be a numeric value (e.g., a 4-bit field that can carry up to 16 unique values) or a MAC address (e.g., 48-bit field that uniquely identifies the MAC address of the intended link). For example, the link identifier may be a MAC address of an intended station (STA) or a basic service set identifier (BSSID) of an intended link.

In some aspects, receiver device 320 may identify the link identifier in a dedicated element of the management frame. For example, a new information element may be specified that is appended as a last information element within the management frame (or another specified position). In this case, receiver device 320 may identify the link identifier at a specified information element location. In this way, using an information element in the management frame enables protection for the link identifier.

In some aspects, receiver device 320 may identify a plurality of link identifiers (or a link identifier applicable to a plurality of links) in the management frame. For example, receiver device 320 may receive a plurality of consecutive management frames (e.g., transmitter device 310 may transmit the plurality of consecutive management frames using short interframe space (SIFS) bursting) with management frames including link identifiers for different links. Additionally, or alternatively, receiver device 320 may identify a plurality of link identifiers in an aggregated management frame. For example, transmitter device 310 may aggregate a plurality of management frames with corresponding link information into a single physical layer (PHY) protocol data unit (PPDU). In order to support more than one management frame carried in a single PPDU, a block acknowledgement scheme for management frames may be used. For example, in the block acknowledgement scheme the management frames may have a sequence number associated therewith and a block acknowledgement (ACK) frame may be used to acknowledge a plurality of management frames based at least in part on respective sequence numbers.

In some aspects, receiver device 320 may parse a field to identify a plurality of link identifiers of a plurality of links to which the link information applies. For example, when the link identifier is in an A3 field, receiver device 320 may identify a plurality of information elements conveying a plurality of link identifiers, such as a plurality of target wake time (TWT) information elements conveying a plurality of link identifiers. Additionally, or alternatively, receiver device 320 may identify a plurality of dedicated link identifier information elements conveying a plurality of link identifiers (e.g., based at least in part on a specification specifying a plurality of dedicated link identifier information elements or based at least in part on parsing the management frame to identify the plurality of dedicated link identifier information elements).

Additionally, or alternatively, when the link identifier is included in the HE control, the HE control may be specified to have a configuration to enable signaling of a plurality of link identifiers. As an example, HE control may include 4 bits for signaling HE A-Control Type and a link identifier may be 8 bits. In this case, a 2-bit field may be specified to enable signaling of a pre-defined set of links. For example, a value of 0 may indicate that the link information applies to all links, resulting in the A-Control having 6 bits (4 type bits and 2 bits for the 2-bit field). In this case, receiver device 320 may use the 2-bit field to determine the size of the A-Control and thereby parse the HE control to determine one or more link identifiers. As another example, a value of 1 may indicate that the link information applies to a single link, which may indicate an A-Control size of 14 bits (e.g., 4 type bits, a 2-bit field, and a single 8-bit link identifier). Similarly, a value of 2 may indicate that the link information applies to two links, which may indicate an A-Control size of 22 bits and a value of 3 may indicate that the link information applies to three links, which may indicate an A-Control size of 30 bits. In this way, using a two-bit field and a variable size A-Control, transmitter device 310 may indicate, and receiver device 320 may identify, a plurality of link identifiers. Further, such a signaling scheme will enable defining a variable size A-Control field.

In some aspects, receiver device 320 may update a communication configuration based at least in part on one or more identified link identifiers. For example, receiver device 320 may update a link on which the link information is received, a different link than the link on which the link information is received, a plurality of links (one of which may or may not be the link on which the link information is received), and/or the like. For example, as shown in FIG. 3B, a TWT information frame transmitted by an access point (AP2) of an access point MLD (e.g., transmitter device 310) on a first link may include a link identifier to update a schedule or parameter for a second link, thereby enabling schedule or parameter updating when the second link is unreachable (e.g., in a low-power state, out of range, subject to congestion or interference, and/or the like). In this case, as shown in FIG. 3B, a non-AP station (STA2) of a non-AP MLD (e.g., receiver device 320) may transmit an acknowledgement for the TWT information. As a result, the non-AP MLD may extend a doze state (e.g., a power saving state) for another non-AP station (STA1) of the non-AP MLD without having to wake the other station up to receive link information associated with extending the doze state. In this way, transmitter device 310 and receiver device 320 may use the link identifier for cross-link signaling. In some aspects, the link identifier may map a receiver not ready (RNR) entry to a multi-link address (MLA) information element. For example, when an HE control or link identifier information element conveys the link identifier (e.g., a numeric value that may be one octet, two octets, and/or the like, which may be in contrast to an Address 3 field which may convey a MAC address having 6 octets), the link identifier may map an RNR entry to an MLA information element.

As indicated above, FIGS. 3A and 3B are provided as an example. Other examples may differ from what is described with respect to FIGS. 3A and 3B.

Figure 4:
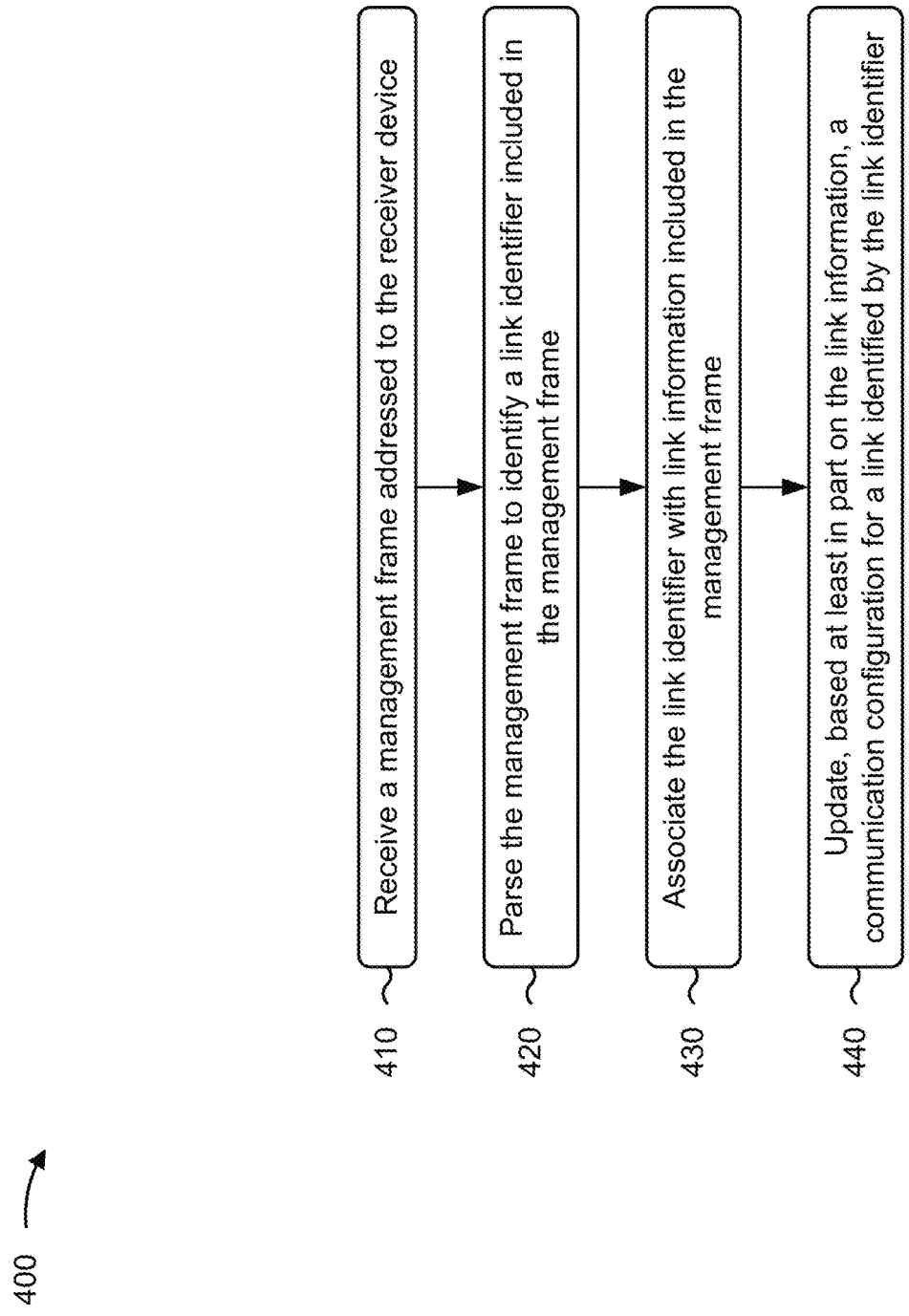
FIGS. 4-6 are diagrams illustrating example processes associated with link identification for management frame conveyed information, in accordance with the present disclosure.

FIG. 4 is a diagram illustrating an example process 400 performed, for example, by a receiver device, in accordance with various aspects of the present disclosure. Example process 400 is an example where the receiver device (e.g., which may be an MLD, BS 110, UE 120, receiver device 320, and/or the like) performs operations associated with link identification for management frame conveyed information.

As shown in FIG. 4, in some aspects, process 400 may include receiving a management frame addressed to the receiver device (block 410). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may receive a management frame addressed to the receiver device, as described above.

As further shown in FIG. 4, in some aspects, process 400 may include parsing the management frame to identify a link identifier included in the management frame (block 420). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may parse the management frame to identify a link identifier included in the management frame, as described above.

As further shown in FIG. 4, in some aspects, process 400 may include associating the link identifier with link information included in the management frame (block 430). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may associate the link identifier with link information included in the management frame, as described above.

As further shown in FIG. 4, in some aspects, process 400 may include updating, based at least in part on the link information, a communication configuration for a link identified by the link identifier (block 440). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may update, based at least in part on the link information, a communication configuration for a link identified by the link identifier, as described above.

Process 400 may include additional aspects, such as any single aspect or any combination of aspects described below and/or in connection with one or more other processes described elsewhere herein.

In a first aspect, the link identifier includes information identifying a station associated with the receiver device and to which the link information is applicable, and the information identifying the station is included in an Address 3 (A3) field of the management frame.

In a second aspect, alone or in combination with the first aspect, the information identifying the station is a unique MAC address differentiating the station from an MLD associated with the station.

In a third aspect, alone or in combination with one or more of the first and second aspects, the receiver device is configured to determine that the information is associated with identifying the station based at least in part on at least one of a U/L bit of a MAC address of the management frame, a reserved field in the MAC address, or a type of frame of the management frame.

In a fourth aspect, alone or in combination with one or more of the first through third aspects, the link identifier is included in an HE control of a header of the management frame.

In a fifth aspect, alone or in combination with one or more of the first through fourth aspects, the HE control and the link identifier are repeated as an information element in a body of the management frame, and the receiver device is configured to verify, before updating the communication configuration, the link identifier in the header of the management frame against the link identifier in the information element in the body of the management frame.

In a sixth aspect, alone or in combination with one or more of the first through fifth aspects, the receiver device is configured to check, before updating the communication configuration, the HE control against an MIC for the HE control that is included in an information element in a body of the management frame.

In a seventh aspect, alone or in combination with one or more of the first through sixth aspects, the receiver device is configured to check, before updating the communication configuration, the HE control using AAD, and the AAD is one of: a variable size AAD, or a fixed size AAD that includes one or more bits of a packet number field and applies to one or more link identifiers.

In an eighth aspect, alone or in combination with one or more of the first through seventh aspects, the link identifier is included in a dedicated element of the management frame.

In a ninth aspect, alone or in combination with one or more of the first through eighth aspects, the management frame is one of a set of consecutive management frames including common link information applying to a corresponding set of link identifiers.

In a tenth aspect, alone or in combination with one or more of the first through ninth aspects, the management frame is an aggregated into a PPDU including a plurality of management frames with a plurality of link identifiers for a plurality of links.

In an eleventh aspect, alone or in combination with one or more of the first through tenth aspects, the receiver device is configured to acknowledge the PPDU using a plurality of sequence numbers corresponding to the plurality of management frames aggregated into the PPDU.

In a twelfth aspect, alone or in combination with one or more of the first through eleventh aspects, the management frame includes a plurality of information elements conveying a plurality of link identifiers of a plurality of links to which the link information applies.

In a thirteenth aspect, alone or in combination with one or more of the first through twelfth aspects, the management frame includes a plurality of link identifier information elements conveying a plurality of link identifiers of a plurality of links to which the link information applies.

In a fourteenth aspect, alone or in combination with one or more of the first through thirteenth aspects, the management frame includes an HE control with a field to identify a plurality of link identifiers of a plurality of links to which the link information applies.

In a fifteenth aspect, alone or in combination with one or more of the first through fourteenth aspects, the link identifier maps to a cross-link parameter.

In a sixteenth aspect, alone or in combination with one or more of the first through fifteenth aspects, the field of the HE control may be a variable length field and the variable length may be based at least in part on a quantity of link identifiers in the plurality of link identifiers.

In a seventeenth aspect, alone or in combination with one or more of the first through sixteenth aspects, protection for the HE control is in an AAD field.

In an eighteenth aspect, alone or in combination with one or more of the first through seventeenth aspects, an entirety of the HE control is protected in the AAD field.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
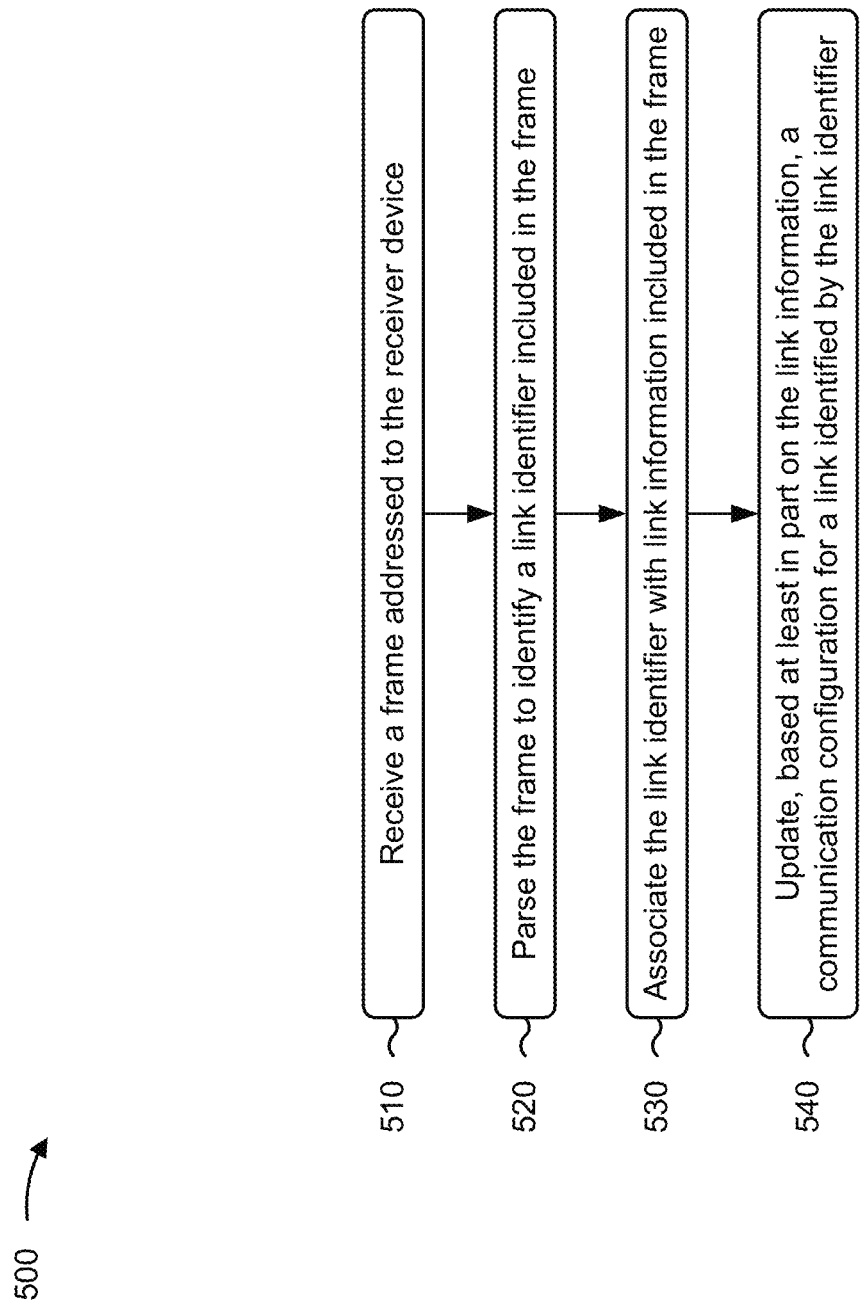

FIG. 5 is a diagram illustrating an example process 500 performed, for example, by a receiver device, in accordance with various aspects of the present disclosure. Example process 500 is an example where the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) performs operations described herein.

As shown in FIG. 5, in some aspects, process 500 may include receiving a frame addressed to the receiver device (block 510). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may receive a frame addressed to the receiver device, as described above.

As further shown in FIG. 5, in some aspects, process 500 may include parsing the frame to identify a link identifier included in the frame (block 520). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may parse the frame to identify a link identifier included in the frame, as described above.

As further shown in FIG. 5, in some aspects, process 500 may include associating the link identifier with link information included in the frame (block 530). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may associate the link identifier with link information included in the frame, as described above.

As further shown in FIG. 5, in some aspects, process 500 may include updating, based at least in part on the link information, a communication configuration for a link identified by the link identifier (block 540). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may update, based at least in part on the link information, a communication configuration for a link identified by the link identifier, as described above.

Process 500 may include additional aspects, such as any single aspect or any combination of aspects described below and/or in connection with one or more other processes described elsewhere herein.

In a first aspect, the link identifier is conveyed in a field other than an HE control of a header of the frame.

In a second aspect, alone or in combination with the first aspect, the field includes at least one of a portion of an SN field, a portion of a PN field, or a portion of an AAD field.

In a third aspect, alone or in combination with one or more of the first and second aspects, protection for the link identifier is conveyed using at least a portion of an AAD field.

In a fourth aspect, alone or in combination with one or more of the first through third aspects, the AAD field includes one or more bits reserved for one or more other fields.

In a fifth aspect, alone or in combination with one or more of the first through fourth aspects, the one or more other fields include at least one of a sequence number field or a packet number field.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
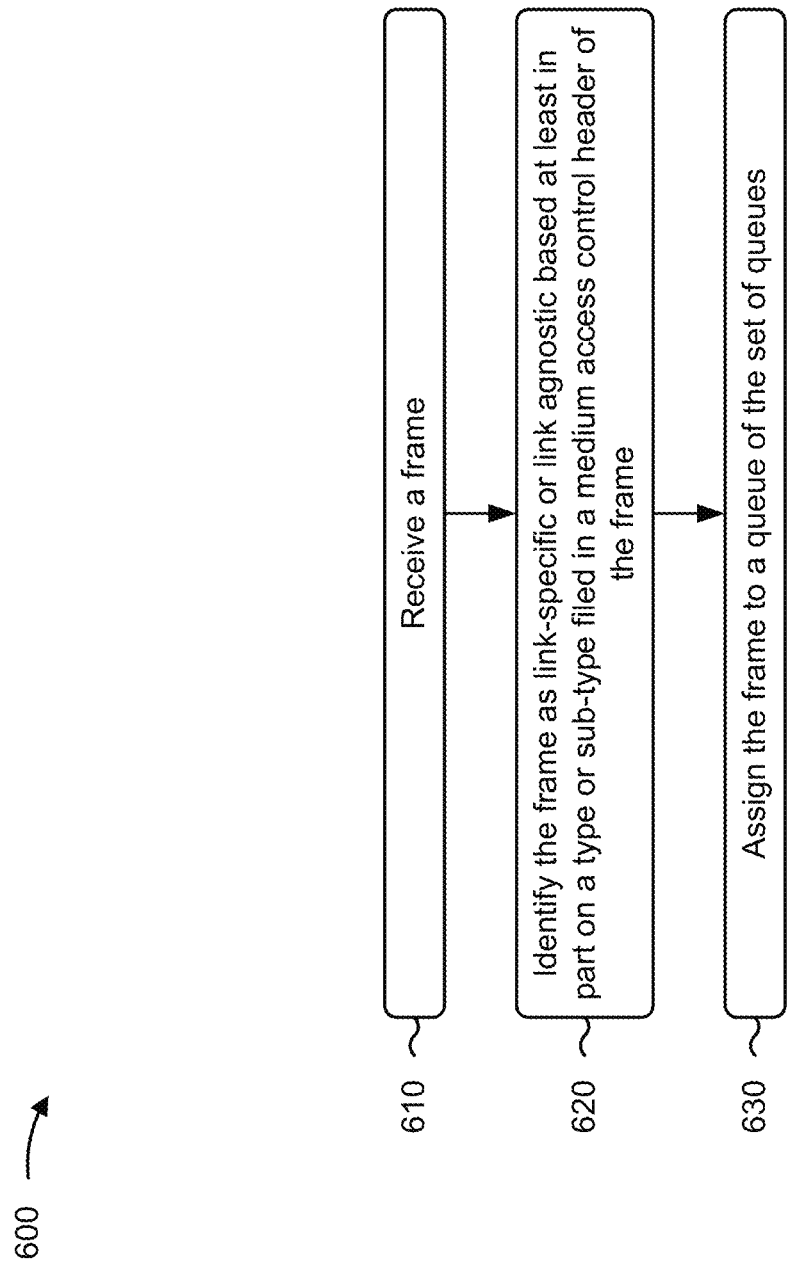

FIG. 6 is a diagram illustrating an example process 600 performed, for example, by a receiver device, in accordance with various aspects of the present disclosure. Example process 600 is an example where the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) performs operations described herein.

As shown in FIG. 6, in some aspects, process 600 may include receiving a frame (block 610). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may receive a frame, as described above.

As further shown in FIG. 6, in some aspects, process 600 may include identifying the frame as link-specific or link agnostic based at least in part on a type or sub-type filed in a medium access control header of the frame (block 620). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may identify the frame as link-specific or link agnostic based at least in part on a type or sub-type filed in a medium access control header of the frame, as described above. In some aspects, link agnostic frames are associated with the MLD. Examples of link agnostic frames include a re-association request frame, a re-association response frame, an association request frame, an association response frame, or an add block acknowledgement (ACK) (ADDBA) frame, among other examples.

As further shown in FIG. 6, in some aspects, process 600 may include assigning the frame to a queue of the set of queues (block 630). For example, the receiver device (e.g., an MLD using antenna 234, DEMOD 232, MIMO detector 236, receive processor 238, controller/processor 240, antenna 252, DEMOD 254, MIMO detector 256, receive processor 258, controller/processor 280, and/or the like) may assign the frame to a queue of the set of queues, as described above.

Process 600 may include additional aspects, such as any single aspect or any combination of aspects described below and/or in connection with one or more other processes described elsewhere herein.

In a first aspect, a packet number is obtained from a common pool.

In a second aspect, alone or in combination with the first aspect, one or more link agnostic frames are assigned to a common queue of the set of queues.

In a third aspect, alone or in combination with one or more of the first and second aspects, process 600 includes performing a replay check at a link-level for a link-specific frame.

In a fourth aspect, alone or in combination with one or more of the first through third aspects, process 600 includes performing a replay check at an MLD level for a link-agnostic frame.

In a fifth aspect, alone or in combination with one or more of the first through fourth aspects, the set of queues includes a common queue and at least one link-specific queue.

In a sixth aspect, alone or in combination with one or more of the first through fifth aspects, the set of queues includes at least one link-specific queue and does not include a common queue.

In a seventh aspect, alone or in combination with one or more of the first through sixth aspects, process 600 includes queuing a link-specific management frame to a link-specific queue.

In an eighth aspect, alone or in combination with one or more of the first through seventh aspects, process 600 includes queuing a link-agnostic management frame to an active link-specific queue.

In a ninth aspect, alone or in combination with one or more of the first through eighth aspects, a first frame includes a link identifier field in an initial portion of the first frame, and the one or more processors are configured to encapsulate or tunnel a second frame that includes content applicable to a particular link and transmit the first frame on any available link. In some aspects, the first frame may provide one or more of a length of the second frame, frame header information for the second frame, or a frame body for the second frame. For example, in a multi-link setup include two or more links, an AP or non-AP STA of an MLD may transmit a frame (e.g., Multi-Link Encapsulation frame), which encapsulates a MAC management protocol data unit (MMPDU). The Multi-Link Encapsulation frame may include one or more of an MMPDU Length field, an MMPDU Frame Control field, or an MMPDU Frame Body field, among other examples. The Multi-Link Encapsulation frame may be transmitted on a first link carrying an MMPDU intended for the second or third link.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
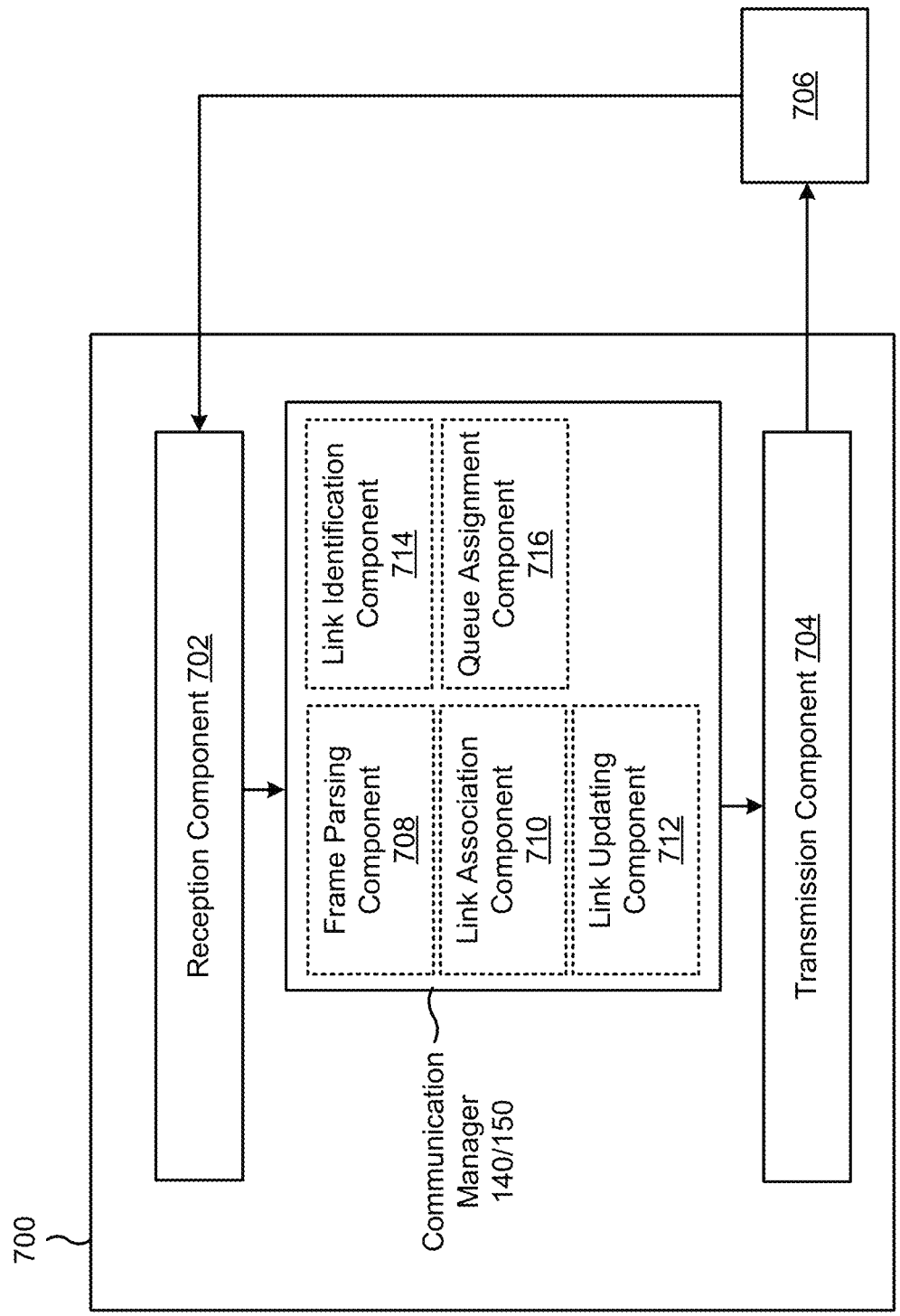
FIG. 7 is a block diagram of an example apparatus for wireless communication, in accordance with the present disclosure.

FIG. 7 is a block diagram of an example apparatus 700 for wireless communication. The apparatus 700 may be a receiver device, or a receiver device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140 or 150. The communication manager 140 or 150) may include one or more of a frame parsing component 708, a link association component 710, a link updating component 712, a link identification component 714, or a queue assignment component 716, among other examples.

In some aspects, the apparatus 700 may be configured to perform one or more operations described herein in connection with FIGS. 3A-3B. Additionally, or alternatively, the apparatus 700 may be configured to perform one or more processes described herein, such as process 400 of FIG. 4, process 500 of FIG. 5, process 600 of FIG. 6, or a combination thereof. In some aspects, the apparatus 700 and/or one or more components shown in FIG. 7 may include one or more components of the receiver device described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the receiver device described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the receiver device described in connection with FIG. 2. In some aspects, the transmission component 704 may be co-located with the reception component 702 in a transceiver.

The reception component 702 may receive a management frame addressed to the receiver device. The frame parsing component 708 may parse the management frame to identify a link identifier included in the management frame. The link association component 710 may associate the link identifier with link information included in the management frame. The link updating component 712 may update, based at least in part on the link information, a communication configuration for a link identified by the link identifier.

The reception component 702 may receive a frame addressed to the receiver device. The frame parsing component 708 may parse the frame to identify a link identifier included in the frame. The link association component 710 may associate the link identifier with link information included in the frame. The link updating component 712 may update, based at least in part on the link information, a communication configuration for a link identified by the link identifier.

The reception component 702 may receive a frame. The link identification component 714 may identify the frame as link-specific or link agnostic based at least in part on a type or sub-type filed in a medium access control header of the frame. The queue assignment component 716 may assign the frame to a queue of the set of queues.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a receiver device, comprising: receiving a management frame addressed to the receiver device; parsing the management frame to identify a link identifier included in the management frame; associating the link identifier with link information included in the management frame; and updating, based at least in part on the link information, a communication configuration for a link identified by the link identifier.

Aspect 2: The method of aspect 1, wherein the link identifier includes information identifying a station associated with the receiver device and to which the link information is applicable, and wherein the information identifying the station is included in an Address 3 (A3) field of the management frame.

Aspect 3: The method of aspect 2, wherein the information identifying the station is a unique medium access control (MAC) address differentiating the station from a multi-link device (MLD) associated with the station.

Aspect 4: The method of any one of aspects 2 to 3, wherein the receiver device is configured to determine that the information is associated with identifying the station based at least in part on at least one of a Universal/Local (U/L) bit of a medium access control (MAC) address of the management frame, a reserved field in the MAC address, or a type of frame of the management frame.

Aspect 5: The method of any one of aspects 1 to 4, wherein the link identifier is included in a high efficiency (HE) control of a header of the management frame.

Aspect 6: The method of aspect 5, wherein protection for the HE control is in an additional authentication data (AAD) field.

Aspect 7: The method of aspect 6, wherein an entirety of the HE control is protected in the AAD field.

Aspect 8: The method of any one of aspects 5 to 7, wherein the HE control and the link identifier are repeated as an information element in a body of the management frame, and wherein the receiver device is configured to verify, before updating the communication configuration, the link identifier in the header of the management frame against the link identifier in the information element in the body of the management frame.

Aspect 9: The method of any one of aspects 5 to 8, wherein the receiver device is configured to check, before updating the communication configuration, the HE control against a message integrity code (MIC) for the HE control that is included in an information element in a body of the management frame.

Aspect 10: The method of any one of aspects 5 to 9, wherein the receiver device is configured to check, before updating the communication configuration, the HE control using additional authentication data (AAD), and wherein the AAD is one of: a variable size AAD, or a fixed size AAD that includes one or more bits of a packet number field and applies to one or more link identifiers.

Aspect 11: The method of any one of aspects 1 to 10, wherein the link identifier is included in a dedicated element of the management frame.

Aspect 12: The method of any one of aspects 1 to 11, wherein the management frame is one of a set of consecutive management frames including common link information applying to a corresponding set of link identifiers.

Aspect 13: The method of any one of aspects 1 to 12, wherein the management frame is an aggregated into a physical layer (PHY) protocol data unit (PPDU) including a plurality of management frames with a plurality of link identifiers for a plurality of links.

Aspect 14: The method of aspect 13, wherein the receiver device is configured to acknowledge the PPDU using a plurality of sequence numbers corresponding to the plurality of management frames aggregated into the PPDU.

Aspect 15: The method of any one of aspects 1 to 14, wherein the management frame includes a plurality of information elements conveying a plurality of link identifiers of a plurality of links to which the link information applies.

Aspect 16: The method of any one of aspects 1 to 15, wherein the management frame includes a plurality of link identifier information elements conveying a plurality of link identifiers of a plurality of links to which the link information applies.

Aspect 17: The method of any one of aspects 1 to 16, wherein the management frame includes a high efficiency (HE) control with a field to identify a plurality of link identifiers of a plurality of links to which the link information applies.

Aspect 18: The method of aspect 17, wherein the field of the HE control may be a variable length field and the variable length may be based at least in part on a quantity of link identifiers in the plurality of link identifiers.

Aspect 19: The method of any one of aspects 1 to 18, wherein the link identifier maps to a cross-link parameter.

Aspect 20: The method of aspect 6, wherein a portion of the HE control that conveys the link identifier is protected in the AAD field.

Aspect 21: The method of any one of aspect 6 or aspect 20, wherein a portion of the HE control is protected in the AAD field.

Aspect 22: The method of aspect 21, wherein the portion of the HE control includes one or more A-Control fields.

Aspect 23: A method of wireless communication performed by a receiver device, comprising: receiving a frame addressed to the receiver device; parsing the frame to identify a link identifier included in the frame; associating the link identifier with link information included in the frame; and updating, based at least in part on the link information, a communication configuration for a link identified by the link identifier.

Aspect 24: The method of aspect 23, wherein the link identifier is conveyed in a field other than a high efficiency (HE) control of a header of the frame.

Aspect 25: The method of aspect 24, wherein the field includes at least one of: a portion of a sequence number (SN) field, a portion of a packet number (PN) field, or a portion of an additional authentication data (AAD) field.

Aspect 26: The method of any one of aspects 23 to 24, wherein protection for the link identifier is conveyed using at least a portion of an additional authentication data (AAD) field.

Aspect 27: The method of aspect 26, wherein the AAD field includes one or more bits reserved for one or more other fields.

Aspect 28: The method of aspect 27, wherein the one or more other fields includes at least one of: a sequence number field or a packet number field.

Aspect 29: An apparatus for wireless communication at a device, comprising a processor; memory coupled with the processor; and instructions stored in the memory and executable by the processor to cause the apparatus to perform the methods of one or more aspects of aspects 1-22.

Aspect 30: A device for wireless communication, comprising a memory and one or more processors coupled to the memory, the one or more processors configured to perform the methods of one or more aspects of aspects 1-22.

Aspect 31: An apparatus for wireless communication, comprising at least one means for performing the methods of one or more aspects of aspects 1-22.

Aspect 32: A non-transitory computer-readable medium storing code for wireless communication, the code comprising instructions executable by a processor to perform the methods of one or more aspects of aspects 1-22.

Aspect 33: A non-transitory computer-readable medium storing a set of instructions for wireless communication, the set of instructions comprising one or more instructions that, when executed by one or more processors of a device, cause the device to perform the methods of one or more aspects of aspects 1-22.

Aspect 34: An apparatus for wireless communication at a device, comprising a processor; memory coupled with the processor; and instructions stored in the memory and executable by the processor to cause the apparatus to perform the methods of one or more aspects of aspects 23-28.

Aspect 35: A device for wireless communication, comprising a memory and one or more processors coupled to the memory, the one or more processors configured to perform the methods of one or more aspects of aspects 23-28.

Aspect 36: An apparatus for wireless communication, comprising at least one means for performing the methods of one or more aspects of aspects 23-28.

Aspect 37: A non-transitory computer-readable medium storing code for wireless communication, the code comprising instructions executable by a processor to perform the methods of one or more aspects of aspects 23-28.

Aspect 38: A non-transitory computer-readable medium storing a set of instructions for wireless communication, the set of instructions comprising one or more instructions that, when executed by one or more processors of a device, cause the device to perform the methods of one or more aspects of aspects 23-28.

Aspect 39: The method of any of aspects 1 to 22, further including identifying a link of the receiver device; and where updating the communication configuration includes updating the communication configuration based at least in part on identifying the link of the receiver device.

Aspect 40: The method of any of aspects 1 to 22 or 39, wherein the information identifying the station includes a field associated with identifying a distribution system (DS).

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiver device for wireless communication, comprising:
   one or more memories; and
   one or more processors, coupled to the one or more memories, configured to:
      receive a management frame addressed to the receiver device;
      parse the management frame to identify a link identifier included in the management frame;
      associate the link identifier with link information included in the management frame; and
      update, based at least in part on the link information, a communication configuration for a link identified by the link identifier, wherein the link identifier maps to a cross-link parameter, or the link identifier is used for cross-link signaling, or a combination thereof.

2. The receiver device of claim 1, wherein the link identifier includes information identifying a station associated with the receiver device and to which the link information is applicable, and
   wherein the information identifying the station is included in an Address 3 (A3) field of the management frame.

3. The receiver device of claim 2, further comprising:
   identifying a link of the receiver device; and
   wherein the one or more processors, when updating the communication configuration, are configured to:
      update the communication configuration based at least in part on identifying the link of the receiver device.

4. The receiver device of claim 2, wherein the information identifying the station is a unique medium access control (MAC) address differentiating the station from a multi-link device (MLD) associated with the station.

5. The receiver device of claim 1, wherein the link identifier is included in an information element of the management frame.

6. The receiver device of claim 1, wherein the receiver device is configured to determine information associated with identifying a station based at least in part on a type of frame of the management frame.

7. The receiver device of claim 1, wherein the link identifier is included in a high efficiency (HE) control of a header of the management frame.

8. The receiver device of claim 7, wherein protection for the HE control is in an additional authentication data (AAD) field.

9. The receiver device of claim 8, wherein an entirety of the HE control is protected in the AAD field.

10. The receiver device of claim 8, wherein a portion of the HE control is protected in the AAD field.

11. The receiver device of claim 10, wherein the portion of the HE control includes one or more A-Control fields.

12. The receiver device of claim 7, wherein the HE control and the link identifier are repeated as an information element in a body of the management frame, and
wherein the receiver device is configured to verify, before updating the communication configuration, the link identifier in the header of the management frame against the link identifier in the information element in the body of the management frame.

13. The receiver device of claim 7, wherein the receiver device is configured to check, before updating the communication configuration, the HE control against a message integrity code (MIC) for the HE control that is included in an information element in a body of the management frame.

14. The receiver device of claim 7, wherein the receiver device is configured to check, before updating the communication configuration, the HE control using additional authentication data (AAD), and
wherein the AAD is one of a variable size AAD, or
a fixed size AAD that includes one or more bits of a packet number field and applies to one or more link identifiers.

15. The receiver device of claim 1, wherein the link identifier is included in a dedicated element of the management frame.

16. The receiver device of claim 1, wherein the management frame is one of a set of consecutive management frames including common link information applying to a corresponding set of link identifiers.

17. The receiver device of claim 1, wherein the management frame is an aggregated into a physical layer (PHY) protocol data unit (PPDU) including a plurality of management frames with a plurality of link identifiers for a plurality of links.

18. The receiver device of claim 1, wherein the link identifier is a numeric value or a medium access control (MAC) address.

19. A receiver device for wireless communication, comprising:
one or more memories; and
one or more processors, coupled to the one or more memories, configured to:
receive a frame addressed to the receiver device;
parse the frame to identify a link identifier included in the frame;
associate the link identifier with link information included in the frame; and
update, based at least in part on the link information, a communication configuration for a link identified by the link identifier, wherein the link identifier maps to a cross-link parameter, or the link identifier is used for cross-link signaling, or a combination thereof.

20. The receiver device of claim 19, wherein the link identifier is conveyed in a field other than a high efficiency (HE) control of a header of the frame.

21. The receiver device of claim 20, wherein the field includes at least one of:
a portion of a sequence number (SN) field, a portion of a packet number (PN) field, or
a portion of an additional authentication data (AAD) field.

22. The receiver device of claim 19, wherein protection for the link identifier is conveyed using at least a portion of an additional authentication data (AAD) field.

23. A receiver device for wireless communication, comprising:
a memory;
one or more processors operatively coupled to the memory;
a set of queues; and
wherein the memory and the one or more processors are configured to:
receive a frame;
identify the frame as link-specific or link agnostic based at least in part on a type or sub-type filed in a medium access control header of the frame; and
assign the frame to a queue of the set of queues.

24. The receiver device of claim 23, wherein a packet number is obtained from a common pool.

25. The receiver device of claim 23, wherein one or more link agnostic frames are assigned to a common queue of the set of queues.

26. The receiver device of claim 23, wherein the one or more processors are further configured to:
perform a replay check at a link-level for a link-specific frame.

27. The receiver device of claim 23, wherein the one or more processors are further configured to:
perform a replay check at a multi-link-device (MLD)-level for a link-agnostic frame.

28. The receiver device of claim 23, wherein the set of queues includes a common queue and at least one link-specific queue.

29. A method of wireless communication performed by a receiver device, comprising:
receiving a management frame addressed to the receiver device;
parsing the management frame to identify a link identifier included in the management frame;
associating the link identifier with link information included in the management frame; and
updating, based at least in part on the link information, a communication configuration for a link identified by the link identifier, wherein the link identifier maps to a cross-link parameter, or the link identifier is used for cross-link signaling, or a combination thereof.

30. The receiver device of claim 1, wherein the cross-link parameter or the cross-link signaling is associated with the update of the communication configuration on the link, wherein the link is different that a first link associated with reception of the management frame.

* * * * *